United States Patent
Farah

(10) Patent No.: US 7,900,459 B2
(45) Date of Patent: Mar. 8, 2011

(54) INNER PLENUM DUAL WALL LINER

(75) Inventor: Jorge Farah, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1150 days.

(21) Appl. No.: 11/024,918

(22) Filed: Dec. 29, 2004

(65) Prior Publication Data

US 2006/0137324 A1    Jun. 29, 2006

(51) Int. Cl.
*F02K 1/00* (2006.01)
*F02C 1/00* (2006.01)

(52) U.S. Cl. .................................... 60/770; 60/752

(58) Field of Classification Search ............ 60/770, 60/776, 752–760, 267; 239/265.17
See application file for complete search history.

(56) References Cited

U.S. PATENT DOCUMENTS

| | | | | |
|---|---|---|---|---|
| 3,970,252 A * | 7/1976 | Smale et al. | | 239/127.3 |
| 4,916,906 A * | 4/1990 | Vogt | | 60/757 |
| 5,388,765 A | 2/1995 | Hill et al. | | |
| 5,528,904 A | 6/1996 | Jones et al. | | |
| 5,581,994 A * | 12/1996 | Reiss et al. | | 60/782 |
| 5,758,504 A * | 6/1998 | Abreu et al. | | 60/754 |
| 5,782,294 A * | 7/1998 | Froemming et al. | | 165/168 |
| 6,418,709 B1 * | 7/2002 | Narcus et al. | | 60/766 |
| 7,270,175 B2 * | 9/2007 | Mayer et al. | | 165/47 |

FOREIGN PATENT DOCUMENTS

| | | |
|---|---|---|
| EP | 1600608 | 11/2005 |
| JP | 58072822 | 4/1983 |
| JP | 2002242702 | 8/2002 |
| WO | 03/006883 | 1/2003 |

OTHER PUBLICATIONS

Japanese Office Action mailed on Mar. 4, 2008.
Extended European Search Report dated Dec. 4, 2009.

* cited by examiner

*Primary Examiner* — Michael Cuff
*Assistant Examiner* — Gerald L Sung
(74) *Attorney, Agent, or Firm* — Carlson, Gaskey & Olds

(57) ABSTRACT

An exhaust nozzle assembly includes an inner liner exposed to hot combustion gases and an outer liner spaced a radial distance from the inner liner to form an annular chamber. The inner liner includes a hot side that is directly exposed to the hot combustion gas flow and a cold side is exposed to cooling air within the chamber. The outer liner includes an outer surface exposed to cooling air flow up to a restriction preventing communication of cooling air flow. A plenum is attached to the outer liner to define a plenum chamber that extends into an end portion. The plenum chamber receives cooling air flow from a supply opening and communicates that air to an end portion through a plurality of impingement openings that provide impingement flow of cooling air outboard of the restriction.

15 Claims, 2 Drawing Sheets

INNER PLENUM DUAL WALL LINER

The U.S. Government may have certain rights in this invention in accordance with Contract Number N00019-02-C-3003 awarded by the United States Navy.

BACKGROUND OF THE INVENTION

This invention relates generally to an exhaust liner for a turbine engine. More particularly, this invention relates to an exhaust liner with impingement cooling of an end portion of the exhaust liner.

A gas turbine engine includes a compressor, a combustor and a turbine. Compressed air mixed with fuel in the combustor generates an axial flow of hot gases. The hot gases flow through the turbine and against a plurality of turbine blades. The turbine blades transform the flow of hot gases into mechanical energy for driving a rotor shaft that in turn drives the compressor. An exhaust liner assembly directs, contains, and protects other engine components from hot combustion gases exhausted from the turbine engine.

The exhaust liner assembly typically includes a hot side liner and a cold side liner spaced radially apart. The hot side liner includes a surface in contact with the hot combustion gases. The cold side liner includes a plurality of openings for cooling air. The hot side liner is cooled to maintain a desired temperature and to protect against exposure to the hot combustion gases. Cooling is provided by cooling air flowing through the cold side liner and impinging on the hot side liner. The impingement flow provides the desired cooling effects by directly striking the hot side liner.

Although the impingement flow is typically adequate for cooling the hot side liner and maintaining a desired temperature, there are some locations, such as end regions where support structures may cover a portion of the cold side liner preventing cooling holes from communicating with a source of cooling air flow. In such locations, cooling is typically accomplished by allowing cooling flow to migrate within the space between the cold side liner and the hot side liner. Disadvantageously, the inability to impinge cooling flow against the hot side liner reduces cooling efficiency.

Accordingly, it is desirable to develop an exhaust liner with improved features for providing impingement cooling of a hot side liner in local regions blocked from direct communication with cooling air flow.

SUMMARY OF THE INVENTION

This invention is a dual wall exhaust nozzle liner assembly that includes a plenum chamber for communicating impingement cooling air outboard of features preventing communication of cooling air flow.

An example exhaust nozzle assembly according to this invention includes an inner liner exposed to hot combustion gases and an outer liner spaced a radial distance from said inner liner to form a chamber. The inner liner includes a hot side that is directly exposed to the hot combustion gases and a cold side exposed to cooling air within the chamber. The outer liner includes an outer surface exposed to cooling air flow. The cooling air flow flows through a plurality of cooling air openings and impinges on the inner liner. The impinging flow of cooling air cools the inner liner to maintain a desired temperature. Cooling air that impinges on the inner liner than either flows out a closeout portion, or flows into the hot gas stream through a plurality of diffusion openings. Air flowing from the diffusion openings generates a insulating film of cooling air along the hot side of the inner liner.

Impinging cooling airflow is provided substantially to an end portion of the inner liner, outboard of obstructions preventing cooling airflow through the outer liner. A plenum is attached to the outer liner and defines a plenum chamber that extends into the end portion. The plenum chamber receives cooling air flow from a supply opening and communicates cooling air flow outboard of any obstruction. The plenum includes a plurality of impingement openings that provide impingement flow of cooling air in the end portion directly against the inner liner.

Accordingly, the plenum chamber of this invention communicates cooling air flow into the end portion of the exhaust liner assembly such that impingement cooling flow can be communicated outboard of obstructions to cooling air flow.

These and other features of the present invention can be best understood from the following specification and drawings, the following of which is a brief description.

DETAILED DESCRIPTION OF THE PREFERRED EMBODIMENT

Figure 1:
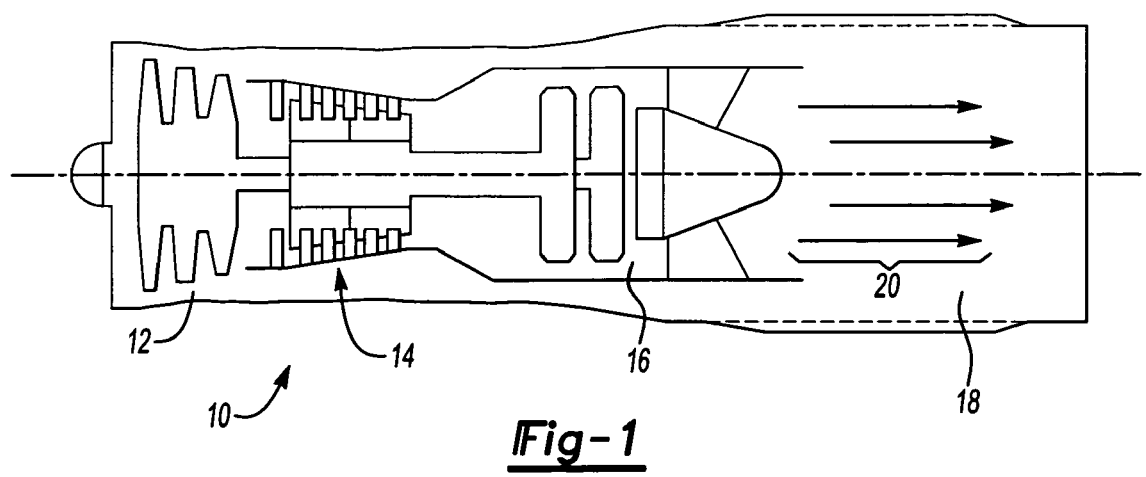
FIG. 1 is a schematic view of a gas turbine engine including an exhaust nozzle according to this invention.

Referring to FIG. 1 a turbine engine assembly 10 includes a compressor 12, a combustor 14 and a turbine 16. The turbine engine assembly 10 operates in a known manner by feeding compressed air from the compressor 12 to the combustor 14. The compressed air is mixed with fuel and ignited to produce an axial flow of hot gases 20. A turbine 16 transforms the axial flow of hot gases 20 into mechanical energy to drive the compressor 12. The hot gases 20 are directed by an exhaust nozzle assembly 18 out of the engine assembly 10. The exhaust nozzle assembly 18 encounters extreme temperatures due to exposure to the hot gases 20 and is cooled by a flow of cooling air.

Figure 2:
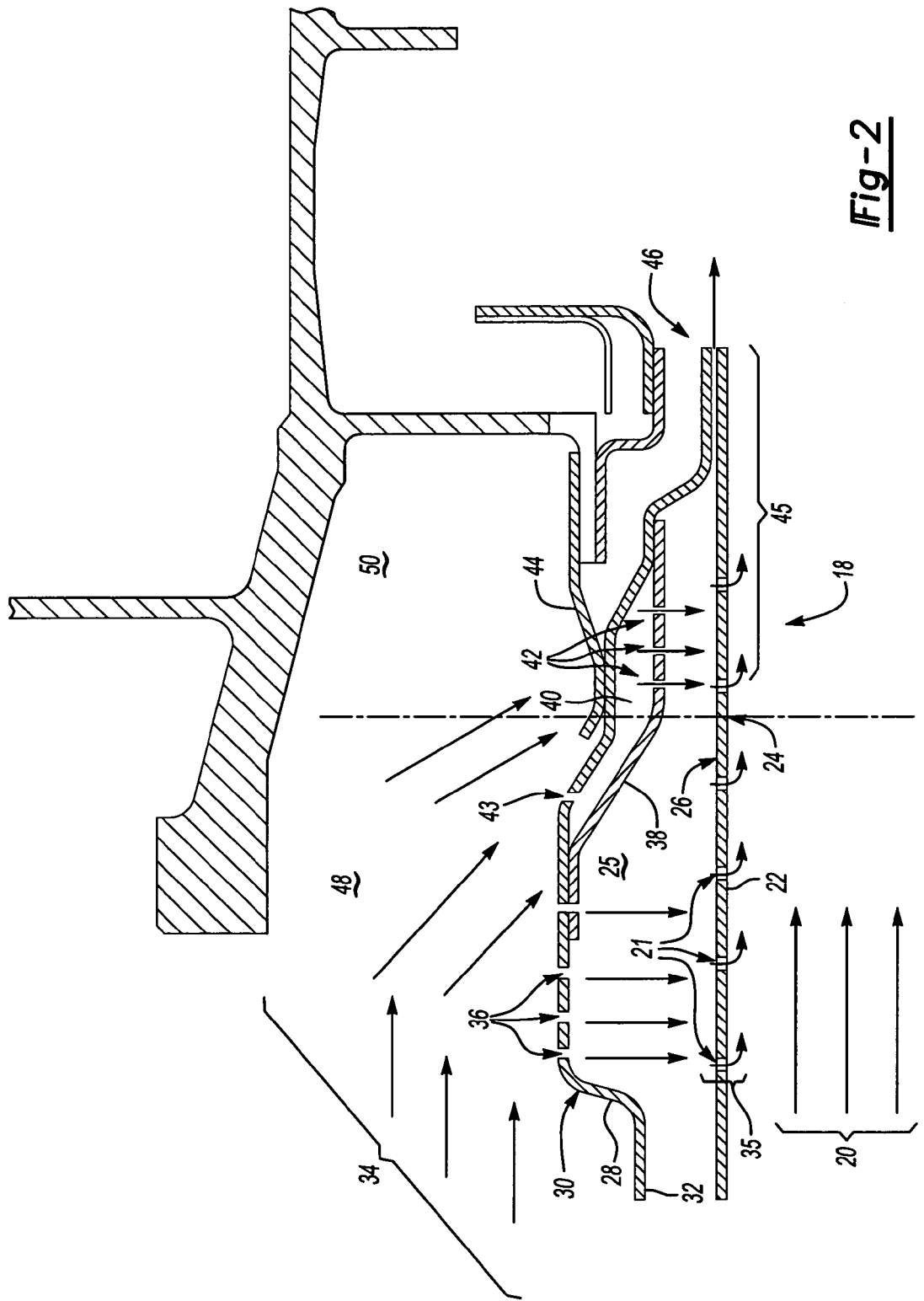
FIG. 2 is a schematic cross-section of an exhaust liner according to this invention.

Referring to FIG. 2, an enlarged cross-section of an end portion of the example exhaust nozzle assembly 18 is shown. The example exhaust nozzle assembly 18 includes a dual wall construction having an inner liner 22 exposed to the hot gases 20 and an outer liner 28 spaced a radial distance from the inner liner 22 to form an annular chamber 25.

The inner liner 22 includes a hot side 24 that is directly exposed to the hot gases 20. A cold side 26 is exposed to cooling air within the chamber 25. The outer liner 28 includes an outer surface 30 that is exposed to cooling air flow 34. The cooling air flow 34 flows through a plurality of cooling air openings 36 to impinge on the cold side 26 of the inner liner 22. The impinging flow of cooling air 34 cools the inner liner 22 to maintain a desired temperature.

The inner liner 22 includes a plurality of diffusion openings 21 that communicate a diffusion cooling airflow 35 to the hot side 24 of the inner liner 22. The diffusion cooling airflow 35 generates a film of cooling air between the hot side 24 and the hot gases 20. The insulating film created by diffusion cooling airflow 35 insulates the inner liner 22 against the extreme temperatures of the hot gases 20. The number and orientation of the diffusion openings 25 create the desired insulating film properties that protect the inner liner 22.

The cooling air flow 34 flows through the plurality of openings 36 directly against the cold side 26 of the inner liner 22. The direct impingement of cooling air flow 34 provides the desired cooling affect. Simply flowing cooling air 34 along the cold side 26 is not as effective as directly impinging cooling air flow 34 against the cold side 26 of the inner liner 22. Cooling air flow 34 within the chamber 25 flows toward a close-out 46 and into the flow of hot gases 20. The close-out 46 includes a metered opening for controlling cooling air flow 34 from the annular chamber 25.

A mating hardware seal 44 seals against the outer liner 28 and prevents cooling airflow 34 from reaching an end portion 45 of the exhaust nozzle assembly 18. Cooling air flow 34 is therefore blocked from providing the desirable impinging air flow against the inner liner 22 within the end portion 45. A plenum 38 is provided that defines a plenum chamber 40. The plenum 38 is attached to the inner surface 32 of the outer liner 28 and extends into the end portion 45. The plenum 38 extends between a first region 48, in communication with cooling air flow 34 and into a second region 50 outboard of the seal 44 that does not receive cooling air flow 34 against the outer liner 28.

The plenum chamber 40 receives cooling air flow 34 from a supply opening 43. The cooling air 34 within the plenum chamber 40 flows into the second region 50 outboard of the seal 44. The plenum 38 includes a plurality of impingement openings 42 that provide cooling air flow 34 to the end portion 45 to directly strike the inner liner 22. The plenum chamber 40 is pressurized to provide a pressure gradient forcing the cooling air flow 34 into the end portion 45 and out the plurality of impingement openings 42.

The plenum chamber 40 of this invention provides for the communication of pressurized cooling air flow 34 into the end portion 45 of the exhaust nozzle assembly 18 such that impingement cooling flow can be communicated outboard of restrictive features such as the seal 44.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust liner assembly comprising:
   an inner liner;
   an outer liner spaced apart from said inner liner, said outer liner including a first plurality of openings for impinging cooling air onto said inner liner;
   a closeout defined by the inner liner and the outer liner that includes a metered opening for controlling cooling air flow from a space between the inner liner and the outer liner; and
   a plenum attached to said outer liner to define a separate chamber within a space between said inner liner and said outer liner, the plenum including a plurality of impingement openings, wherein said outer liner includes a first region where an outer surface of the outer liner is exposed to cooling air and includes said first plurality of openings, and a second region where the outer surface of the outer liner is not exposed to cooling air, wherein said plenum and said plurality of impingement openings are disposed within said second region.

2. The assembly as recited in claim 1, wherein said second region is at least partially covered by a seal preventing communication of cooling air to said outer surface of said outer liner within said second region.

3. The assembly as recited in claim 1, wherein said first plurality of openings provide an impingement flow against an outer surface of said inner liner within said first region.

4. The assembly as recited in claim 1, wherein said plurality of impingement openings within said plenum provide an impingement flow against an outer surface of said inner liner within said second region.

5. The assembly as recited in claim 1, wherein said plenum defines a chamber between said inner liner and said outer liner.

6. The assembly as recited in claim 1, wherein said plenum includes a supply opening through said outer liner that is in communication with cooling air.

7. The assembly as recited in claim 1, wherein said plenum comprises a sheet attached to an inner surface of said outer liner.

8. The assembly as recited in claim 1, wherein said inner liner includes a plurality of diffusion openings for generating a diffusion flow of cooling air between an inner surface of said inner liner and hot combustion gases.

9. An exhaust liner assembly comprising:
   an inner find;
   an outer liner spaced apart from said inner liner, said outer liner receiving cooling air on an outer surface and directing said cooling air against an outer surface of said inner liner;
   an end portion including a closeout between said inner liner and said outer liner, the closeout member including a metered opening for controlling airflow from a space between the inner liner and the outer liner,
   a seal engaged to said outer surface of said outer liner within said end portion that prevents cooling air from communicating with said outer surface of said outer liner; and
   a plenum chamber attached within said end portion to define a separate chamber within a space between the inner liner and the outer liner, the plenum chamber including a plurality of impingement openings for impinging cooling air against said outer surface of said inner liner within said end portion, wherein the metered opening is disposed aft of the plenum.

10. The assembly as recited in claim 9, wherein said plenum chamber is attached to an inner surface of said outer liner within said end portion.

11. The assembly as recited in claim 9, wherein said seal prevents communication of cooling air past said seal.

12. The assembly as recited in claim 9, wherein said plenum chamber receives cooling airflow through a cooling air supply opening in said outer liner.

13. The assembly as recited in claim 9, wherein said inner liner includes a hot side exposed to hot combustion gas flow and a plurality of diffusion openings for communicating cooling air to said hot side and generating a film of cooling air between said hot side and said gas flow.

14. The assembly as recited in claim 9, wherein the closeout between the inner liner and the outer liner including the metered opening is formed by an interface between the inner liner and the outer liner.

15. The assembly as recited in claim 1, wherein the metered opening is formed by an interface between the inner liner and the outer liner.

* * * * *